Oct. 22, 1946.    J. W. DOUGHERTY    2,409,742
COIL SUPPORTING ARBOR
Filed Sept. 8, 1943
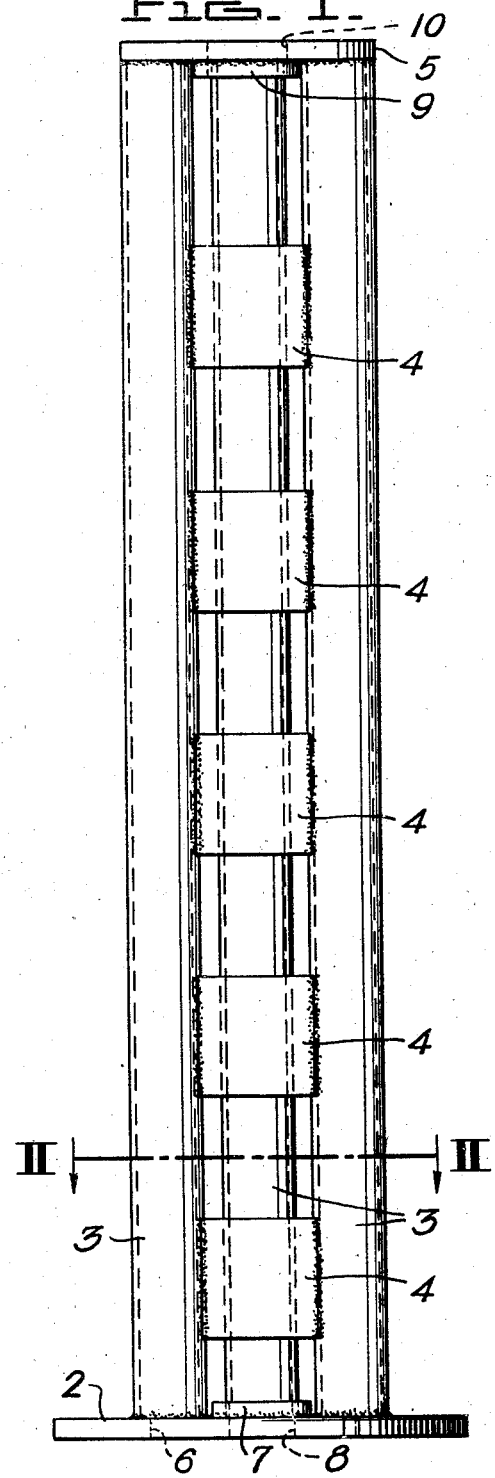
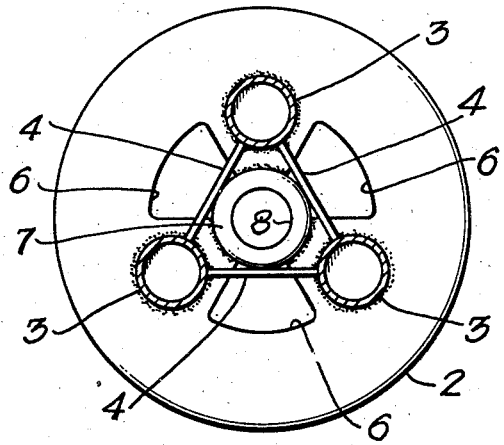
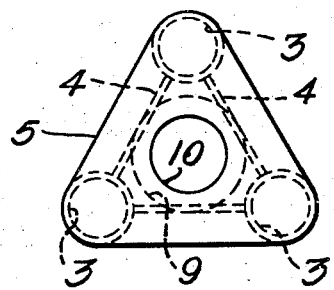
INVENTOR:
JAMES W. DOUGHERTY,
BY
ATTORNEY.

Patented Oct. 22, 1946

2,409,742

UNITED STATES PATENT OFFICE 2,409,742

COIL SUPPORTING ARBOR

James W. Dougherty, McKeesport, Pa., assignor to The American Steel and Wire Company of New Jersey, a corporation of New Jersey Application September 8, 1943, Serial No. 501,580

5 Claims. (Cl. 263—47)

This invention relates to an improvement in a coil supporting arbor such as is used for supporting bundles or coils of rod or wire during annealing or spheriodizing processes and for handling them after annealing. The coil supporting arbor of this application is an improvement on the coil supporting arbor disclosed in the patent to Karp et al. No. 2,278,109. As disclosed in the above mentioned patent, a plurality of coils are placed on the arbor during annealing operations and the arbor is therefore subject to heat which tends to cause buckling and distortion thereof.

It is an object of this invention to provide a coil supporting arbor or stem which will withstand greater loading capacities and resist deformation due to heat.

This and other objects will be more apparent after referring to the following specification and attached drawing, in which:

Figure 1 is an elevation of the arbor;

Figure 2 is a sectional view taken on the line II—II of Figure 1; and

Figure 3 is a plan view.

Referring more particularly to the drawing the reference numeral 2 indicates the base of the arbor which is circular in form and is made from regular hot rolled steel plate. Welded to the base 2 and extending upwardly therefrom are three heavy gauge tubes 3, the tubes being positioned to form an equilateral triangle. At spaced elevations along the length of the tubes are a plurality of intermediate reinforcing members 4 which consist of standard steel plates extending between and welded to the tubes 3. A triangularly shaped plate 5 is welded to the top of the tubes, this serving to reinforce the tubes and also to finish off the top of the arbor. The tubes 3 are more closely spaced at the top than at the bottom, thus forming a taper which facilitates the loading and unloading of the coils of wire. The base 2 is provided with openings 6 between the tubes 3 which permits circulation of hot gases during the annealing or spheriodizing operation. A washer 7 is welded to the top of base 2 in the center thereof directly over a hole 8 in the base 2. A similar washer 9 is welded to the bottom of plate 5 which is provided with an opening 10 directly thereover. These openings permit circulation of hot gases and also serve to facilitate handling of the arbor and mounting of the arbor on suitable loading machines such as the National Standard Type Loader which has a vertical shaft that passes through the openings.

Since the arbor is made of standard plates and tubes, it is easily fabricated and welded together. The use of the tubular uprights enables greater loading capacities and prevents deformation due to heat.

While one embodiment of my invention has been shown and described, it will be apparent that other modifications and adaptations may be made without departing from the scope of the following claims.

I claim:

1. A coil supporting arbor comprising a base on which the coils are supported, a plurality of spaced apart tubes attached to said base inwardly of the periphery thereof and rising therefrom in substantially parallel relationship, a plurality of intermediate reinforcements at spaced elevations fastened to said tubes holding them in spaced relationship, and means fastened to the top of the tubes to hold them in spaced relationship.

2. A coil supporting arbor comprising a base on which the coils are supported, a plurality of spaced apart tubes attached to said base inwardly of the periphery thereof and rising therefrom, said base having openings therein between the tubes, a plurality of intermediate reinforcements at spaced elevations fastened to said tubes holding them in spaced relationship, and means fastened to the top of the tubes to hold them in spaced relationship.

3. A coil supporting arbor comprising a base on which the coils are supported, a plurality of spaced apart tubes welded to said base inwardly of the periphery thereof and rising therefrom in substantially parallel relationship, said tubes being positioned to form an equilateral triangle, a plurality of intermediate reinforcements at spaced elevations welded to said tubes, and a plate welded to the top of the tubes to hold them in spaced relationship.

4. A coil supporting arbor comprising a base on which the coils are supported, a plurality of spaced apart tubes welded to said base inwardly of the periphery thereof and rising therefrom, said tubes being positioned to form an equilateral triangle, said base having openings therein between the tubes, a plurality of intermediate reinforcements at spaced elevations welded to said tubes, and a plate welded to the top of the tubes to hold them in spaced relationship.

5. A coil supporting arbor comprising a base on which the coils are supported, a plurality of spaced apart tubes welded to said base inwardly of the periphery thereof and rising therefrom, said tubes being positioned to form an equilateral triangle, said base having openings therein between the tubes, a plurality of intermediate reinforcements at spaced elevations welded to said tubes, and a plate welded to the top of the tubes to hold them in spaced relationship, each of said base and top plate having a central opening therein.

JAMES W. DOUGHERTY.